United States Patent
Bahr et al.

(10) Patent No.: US 11,595,833 B1
(45) Date of Patent: *Feb. 28, 2023

(54) SYSTEM AND METHOD FOR ACCESS POINT COORDINATION

(71) Applicant: Cable Television Laboratories, Inc, Louisville, CO (US)

(72) Inventors: John Charles Bahr, Superior, CO (US); Neeharika Jesukumar, Snoqualmie, WA (US)

(73) Assignee: Cable Television Laboratories, Inc., Louisville, CO (US)

( * ) Notice: Subject to any disclaimer, the term of this patent is extended or adjusted under 35 U.S.C. 154(b) by 313 days.

This patent is subject to a terminal disclaimer.

(21) Appl. No.: 16/901,999

(22) Filed: Jun. 15, 2020

Related U.S. Application Data (63) Continuation of application No. 15/466,650, filed on Mar. 22, 2017, now Pat. No. 10,687,226.

(60) Provisional application No. 62/311,687, filed on Mar. 22, 2016.

(51) Int. Cl.
*H04W 24/02* (2009.01)
*H04W 48/20* (2009.01)
*H04W 92/20* (2009.01)
*H04W 84/12* (2009.01)

(52) U.S. Cl.
CPC .......... *H04W 24/02* (2013.01); *H04W 48/20* (2013.01); *H04W 84/12* (2013.01); *H04W 92/20* (2013.01)

(58) Field of Classification Search
CPC .............................. H04W 24/02; H04W 48/20
USPC .......................................................... 370/252
See application file for complete search history.

(56) References Cited

U.S. PATENT DOCUMENTS

| | | | |
|---|---|---|---|
| 2013/0036188 A1* | 2/2013 | Ganu ..................... | H04W 48/02 709/217 |
| 2015/0085844 A1* | 3/2015 | Tian ....................... | H04W 36/08 370/338 |
| 2017/0034847 A1* | 2/2017 | He ......................... | H04W 76/20 |
| 2018/0176284 A1* | 6/2018 | Strater .................. | H04W 36/08 |

* cited by examiner

*Primary Examiner* — Christopher M Crutchfield
*Assistant Examiner* — Jean F Voltaire
(74) *Attorney, Agent, or Firm* — Armstrong Teasdale LLP (57) ABSTRACT

A coordinated multiple-AP system and method for alleviating AP overloading, sticky clients, and RF interference for use in a non-WLAN Controller (WLC) communication environment, such as a home network. In the present system and method AP periodically measure the communication environment and share the measured data with other APs in the same communication environment. The shared communication environment data is utilized to collaboratively determine best data transmission scenarios for supported clients. Best data transmission scenarios include but are not limited to optimized Client Link Management and Radio Resource Management.

20 Claims, 5 Drawing Sheets

SYSTEM AND METHOD FOR ACCESS POINT COORDINATION

RELATED APPLICATIONS

This application is a continuation of U.S. patent application Ser. No. 15/466,650, filed Mar. 22, 2017, which prior application claims priority to U.S. Provisional Application Ser. No. 62/311,687 filed Mar. 22, 2016, titled "Wi-Fi Whole Home Coverage: AP Coordination," incorporated in its entirety herein by reference.

BACKGROUND

Providing subscribers with reliable Wi-Fi coverage and capacity in a medium to large sized home, using a single Access Point (AP), is a challenge. Many Wi-Fi users experience dead zones with little or no connectivity at fringe areas in the home. Operators are looking at multiple AP deployments in order to provide effective whole home coverage. In such scenarios, coordination between the APs in a home Extended Service Set (ESS) is required to effectively optimize many aspects of the network such optimal client association and radio resource optimization.

In an enterprise environment the WLAN Controller (WLC) is an essential part of the network and manages the inter-AP communication and coordination in a vendor-proprietary manner. In a home network, however, where there is no WLC, there are also no standards or even defined best practices about how multiple APs in a home ESS should communicate with each other. Thus AP coordination suffers or is non-functional.

Existing coordination technologies could allow Wi-Fi APs in a home Extended Service Set (ESS) network to exchange information, ensuring clients are connected to the best AP for that client without adversely affecting other clients. While all vendors agree on the issues involved in AP Coordination, and some have implemented partial solutions, none have a complete solution. Standard 11v based client steering remains one of the main issues frustrating most vendors.

There is not a currently defined standard protocol that will solve the AP Coordination problem and there is value in defining a standard protocol or set of protocols that provide coordination of client associations and radio resources when multiple APs are deployed in a home.

Many Wi-Fi users' homes require more than one Wi-Fi Access Point (AP) for sufficient coverage. However, adding additional APs, which have been configured correctly and placed in an optimal location, can cause other wireless issues. For example, home ESS (Extended Service Set) networks can experience Wi-Fi client problems. One such client problem is a 'sticky' client or clients that do not roam optimally. Another client problem is where a client or clients unknowingly overload the serving AP even though there may be one or more underutilized APs in the vicinity. Due to the nature of Wi-Fi as a shared medium, these problems create a negative impact on the user experience of the other Wi-Fi clients on the network.

Home Wi-Fi users already expect to stream HD videos to multiple clients simultaneously from all areas of the house, and while moving around in the home, without interruptions. This has a high impact on the network in terms of the bandwidth consumed. Research also shows that Voice over Wi-Fi (VoWi-Fi) will be used extensively within the home networks due to the ubiquity and low cost of Wi-Fi. It is to be noted that, for optimal VoWi-Fi call quality, fast roaming, low latency and low jitter are important.

SUMMARY

The present invention is utilized in a multiple-AP home environment to alleviate AP overloading, sticky clients, and RF interference in a home network.

In the present invention, coordinated APs have a holistic view of the multiple AP network in which they exist, thereby allowing APs to can take action to eliminate client issues.

In an embodiment, APs are configured to coordinate with other APs to accomplish two categories of tasks: Client Link Management (CLM) and Radio Resource Management (RRM). CLM ensures that wireless clients are associated with an optimal AP, see below. RRM ensures that the wireless fronthaul that serves clients and backhaul between APs are both optimized. Optimized here may include but is not limited to avoiding RF interference while maintaining a high throughput fronthaul and backhaul, by changing one or more of channels, bands, channel widths, transmit power, etc.

In an embodiment, APs may perform certain measurements (e.g., MCS rate of client, missed packet counts, transmission errors, etc.) or they can request and/or receive information from 802.11k-capable client measurements (e.g., link measurement reports, station statistics report, transmit stream measurement report, channel load report). For example, APs may receive CLM Information, such as but not limited to AP to Gateway link quality metrics (e.g., throughput, jitter, latency), client association metrics (e.g., the number of associations, the number of disassociations, disassociation/deauthentication reason codes, etc.), current client link metrics (throughput, PER, RSSI, SINR, MCS), client capabilities (operating channels and bands, support for 802.11k/11v), channel utilization/load report per BSS, client band association history and desired band for one or more certain clients (e.g., wireless printers: 2.4 GHz, set-top boxes: 5 GHz), client handoff/steering history (e.g., does a client allow itself to be steered?), CLM relevant AP Information contained in 802.11k Neighbor Reports for ESS and non-ESS neighbors (channel, QoS capable, APSD capable, part of a mobility domain, throughput capabilities (HT/VHT AP), BSS Transition Management preferences, etc.), and Traffic Stream/Traffic Category Measurement Report (e.g., between AP and client—validate capability with steering target AP). In addition, APs may measure or receive RRM Information, such as AP capabilities (channels, bands, channel width, auto channel selection, supported transmit powers, 802.11h supported), current AP settings (current channel and extension channel(s), guard Interval, transmit power, 802.11h enabled, regulatory domain), AP observed noise floor per channel (for each AP—i.e., per location), and AP relative location (distance expressed as dB with respect to other APs).

In an embodiment, APs can share information either in a master/slave architecture or a peer-to-peer architecture. Such sharing of information may be event triggered. Such triggering events include but are not limited to Client Link Management Events, which include a client's MCS dropping below some threshold, a new client association, a client's QoS bandwidth requirement changes significantly (start/stop video stream, VoIP stream), an AP's medium utilization or client count load reaching a high threshold, and a periodic information sharing (e.g., every X minutes). Another triggering events include but are not limited to RRM Events, which include an AP's observed noise significantly increased (including OBSS traffic) triggering the need for a channel switch, the addition or removal of an AP, and one or more significant changes in traffic patterns.

BRIEF DESCRIPTION OF THE INVENTION

DETAILED DESCRIPTION OF THE FIGURES

There are current and emerging standards that specify information to be exchanged between APs and clients. This information allows clients to make better decisions about AP association, and provides information for APs to steer clients to better connections. Often there are clients in the home that do not support these standards. In such cases APs must force clients off an AP to steer them to other channels or bands. However, regardless of whether the clients have implemented these management standards, APs can better manage the network by coordinating efficient client handover and distribution among themselves. For example, a client's current AP can provide a recommendation to, or even force, the client to move to a different Basic Server Set (BSS) based on data describing the AP's own load conditions as well as that of the other APs in the ESS.

In an enterprise environment, the WLAN Controller (WLC) is an essential part of the network and manages the inter-AP communication and coordination in a vendor-proprietary manner. In a home network, however, where there is no WLC, there are also no standards or even defined best practices about how multiple APs in a home ESS should communicate with each other. This is one problem the present invention solves. Other areas of network optimization (e.g., channel and TX power optimization) are also possible utilizing the present in-home AP-AP coordination.

Table 1, below, presents a list of network issues, trigger events, information shared between APs to assist in resolving the network issue (called herein a "Client Association Report" or "CAR" for short), and the AP coordinated decision.

TABLE 1

| Network Issue | Trigger Event(s) | Information Shared between APs | AP Coordinated Decision |
|---|---|---|---|
| Sticky client on AP1 | AP1 sees client TX rate goes below a predetermined low limit AP1 registers a reduction in the overall network throughput due to the sticky client consuming too much airtime | Client MAC address; Each AP's observed RSSI of the client; client capabilities; client handoff/steering history; request and response to move client to AP2 (BSS Transition Management | AP1 andAP2 reach consensus to move client to AP2 |
| Client #1 trying to join an overloaded AP1 when underutilized AP2 is also in range | Overloaded AP1 received ASSOC request from client | Client MAC address; Each APs' observed client RSSI; each AP's load (e.g., 802.11k Channel Load Report); client capabilities; client handoff/steering history; request and response to steer client to AP2 | AP1 andAP2 decide to steer client to associate to AP2 |
| AP1 is overloaded and some clients (e.g., #1 & #2) are within range of AP2 | AP1's number of associated clients is over a predetermined limit or that its channel load is over a predetermined value | Each of AP1's client MAC address; AP2's observed client RSSI - for each client on AP1; each AP's load (e.g., 802.11k Channel Load Report); client capabilities; client handoff/steering history; request and response to move a set of clients to AP2 | AP1 and AP2 decide to move clients #1 & #2 to AP2 |
| Roaming QoS client on AP2 attempting to join an overloaded AP1, AP3 has capacity and is in range | AP2 sees QoS client MCS rate going below some low limit | Client MAC address; client's QoS requirement (e.g., 802.11k Transmit Stream/Category Measurement Report or TSPEC submitted to AP1); Each AP's observed client RSSI; each AP's load (e.g., 802. Ik Channel Load Report); client capabilities; client handoff/steering history; request and response to move client to AP3 | AP1, AP2 and AP3 decide QoS client should roam to AP3 instead of AP1 |
| AP3 experiencing interference on channel from neighbor AP | AP3 observed noise on current channel exceeds some limit, or a client on AP3 reports noise on channel above a certain limit | Each AP's or associated clients', observed Noise Histogram (e.g., 802.11k Noise Histogram Report) on current and other possible channels; all current ESS client channel capabilities; Neighbor report seen by each AP (e.g. 802.11k Neighbor Report); request and response to change channels | AP1 andAP3 decide to each change channels and AP2 decides to remain on the same channel |

Figure 1A:
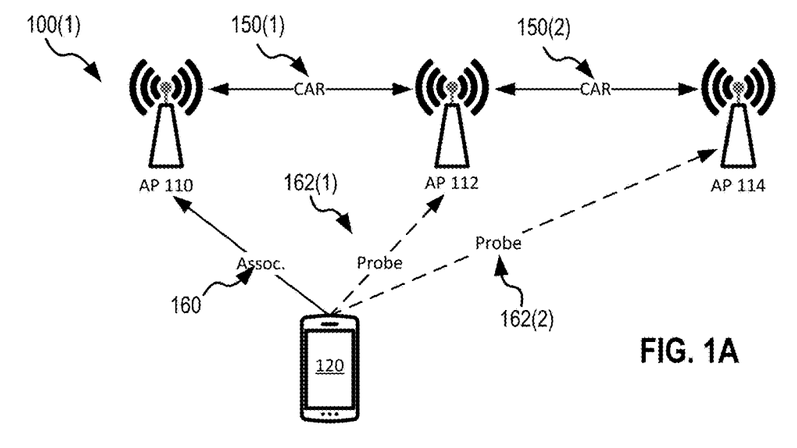
FIGS. 1A-1C show multi-AP system configured to steer a client between APs through AP coordination, in an embodiment.
Figure 1B:
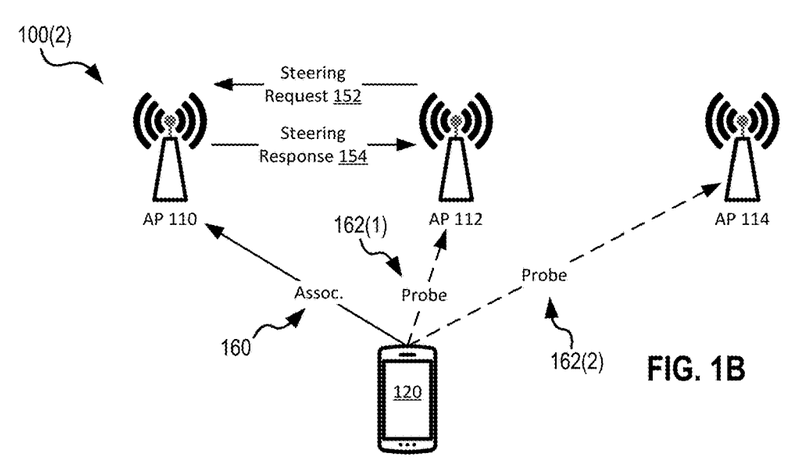
Figure 1C:
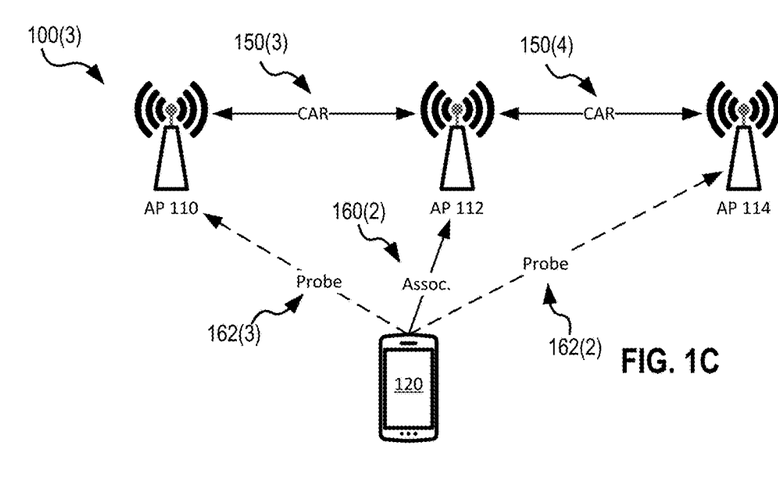

FIGS. 1A-1C show systems 100(1)-(3) configured to steer a client 120 between APs 110, 112, 114 through AP coordination.

Systems 100(1)-(3) all include at least APs 110-114, and a client 120. Client 120 communicates with APs 110-114 via AP coordination is facilitated via the use of client association reports (CARs) 150(1), 150(2). CARs 150 are data reports populated with data collected by and distributed amongst each AP 110-114 such that all APs have the same data or substantially the same data. We say "substantially the same data" because, for example, a first AP may utilize a predictive algorithm to generate predictive data based on the shared data or new data has been generated since the last shared data distribution which will be shared in the next shared data distribution cycle. After distribution of the shared data it may be processed by either a shared algorithm such that consensus is substantially automatically generated through scheduled or periodic execution of that algorithm. Alternatively, consensus is each by cooperative and/or collaborative action by and between two or more of APs 110-114. Such cooperative or collaborative action requires inter AP communication for APs to reach consensus, one such exemplary system and process is described in FIGS. 1-4. Generically described, CARs 150(1), 150(2) include client 120 data, AP 110-114 data, and client-AP data for use in the coordinated client decision making processes described herein. Client data may include but is not limited to SNR of non-associated but probing clients, number of associated clients, associated client MAC address, associated client SNR, and associated client current PHY/MCS rate, client communication capability (e.g., band, channel width, number of spatial streams, MU-MIMO, 802.11 amendments, AP data rates, etc.), client-APs moment vector (spatial and temporal), identification of problematic client (e.g., a sticky client), a Deny MAC Access List, and a list of SSIDs the client may probing (e.g., to provide functionality for steering one or more clients between SSIDs). AP data includes number of clients associated with each AP, AP communication capability (e.g., band, channel width, number of spatial streams, MU-MIMO, 802.11 amendments, and AP data rates), AP specific spatial areas or volumes of problematic communication, and AP backhaul cost relating to throughput and latency. Client-AP data includes optimal and non-optimal protocol or capabilities matches between a client and an AP, and optimal and non-optimal coverage area overlap between a client and an AP. CAR data, which is collected, shared, and processed by the APs 110-114, may be used to at least steer clients between APs or even bands (Client Link Management), and may be used to resolve at least the problems detailed in Table 1, above. APs also handle local Radio Resource Management (RRM), for example channel planning, Tx power, noise, neighbor reports, and 802.11k client reports. APs may also cooperate or coordinate to handle AP discovery, AP configuration (and auto-configuration), security, and act as an interface for upstream monitoring and management.

APs 110-114 may utilize CARs 150 data to control clients, such as client 120. For example, AP may disassociate a client based on processed CARs 150 data to initiate a client steering process. APs 110-114 may also implement and support a Deny MAC Access List to block connection or reconnection attempts by a client or disassociated client to further steer the client. In an embodiment 802.11v BSS Transition Management may also be utilized by APs to transition clients. Other possible protocols utilized by such a system and method include a simple UDP protocol, e.g., a combination of multicast and unicast messages and/or datagrams carried by datagram supporting protocols.

In FIG. 1A, system 100(1) is shown with client 120 in communication with AP 110 via association 160(1), with AP 112 via probe 162(1), and with AP 114 via probe 162(2). CARs 150(1) and 152(2) data is shared amongst APs 110-114, which provides the APs with information (described at least in part above) to determine and coordinate the association of client 120 with an AP that best supports that client. In the instance of system 100(1), FIG. 1A, that AP is AP 110.

In FIG. 1B, system 100(2) shows client 120 has moved away from AP 110 and toward AP 112, which illustratively represents AP 112 may be better situated to support client 120. Illustratively locating client 120 proximate AP 112 symbolically equates a reduced spatial distance with an increase in communication signal strength. One skilled in the art will appreciate that this representation is merely symbolic and may alternatively represent a non-spatial improvement in the communication situation between client 120 and AP 112 as compared to that of client 120 and AP 110 or AP 114. For example, this may represent an improved traffic load distribution by steering client 120 to AP 112, a better technology match between client 120 and AP 112, or something else.

System 100(2) also shows a steering request 152 sent from AP 112 to AP 110 and a steering response 154 sent from AP 110 back to AP 112, which is AP 110's reply to the steering request 152. In an embodiment, steering request 152 was triggered by the change in the wireless environment, e.g., the change in proximity, and therefore the signal strength, of client 120 relative to APs 110-114. Such a change may cause a monitored value to exceed (or alternatively deceed) a threshold value resulting in the initialization of a steering request action, such as that initiate by AP 112. AP 112 may additionally include or transmit separately an updated CAR 150 such that AP 110 (and possibly AP 114) may utilize the same data for decision making.

Steering request 152 is a request by AP 112 to AP 110 for AP 110 to handoff client 120 to AP 120 because AP 112 has determined that it can support client 120 better than AP 110. Upon receipt of steering request 152 AP 110 process the request (and possible the new CAR 150(1) if provided) to determine if AP 110 is in consensus with AP 112. If AP 110 is in consensus with AP 112 it will generate a steering reply 154 which coordinates the handover of client 120. If AP 110 is not in consensus with AP 112 it will generate a steering reply 154 rejects the handover of client 120. Examples in AP 110 may reject steering request 152 is where AP 110 has data not available or shared with AP 112 which informs AP 110 to rejected the request. Such data may include, for example, a history of failed steering attempts or may be AP 110's attempt to avoid client 120 from permanently blacklisting AP 110 in response to AP 110 temporarily blacklist client 120 to assist in steering the client to AP 112. In the example of FIGS. 1A-1C, AP 110 is in consensus with AP 112. System 100(3) of FIG. 1C shows client 120 now associated 160(2) with AP 112 and transmitting probes 162(3) and 162(4) to APs 110 and 114, respectively. System 100(3) also shows new CARs 150(3) and 150(4) shared amongst APs 110-114, which reflects changes to the wireless environment, namely client 120's association with AP 112 and disassociation with AP 110.

Figure 2:
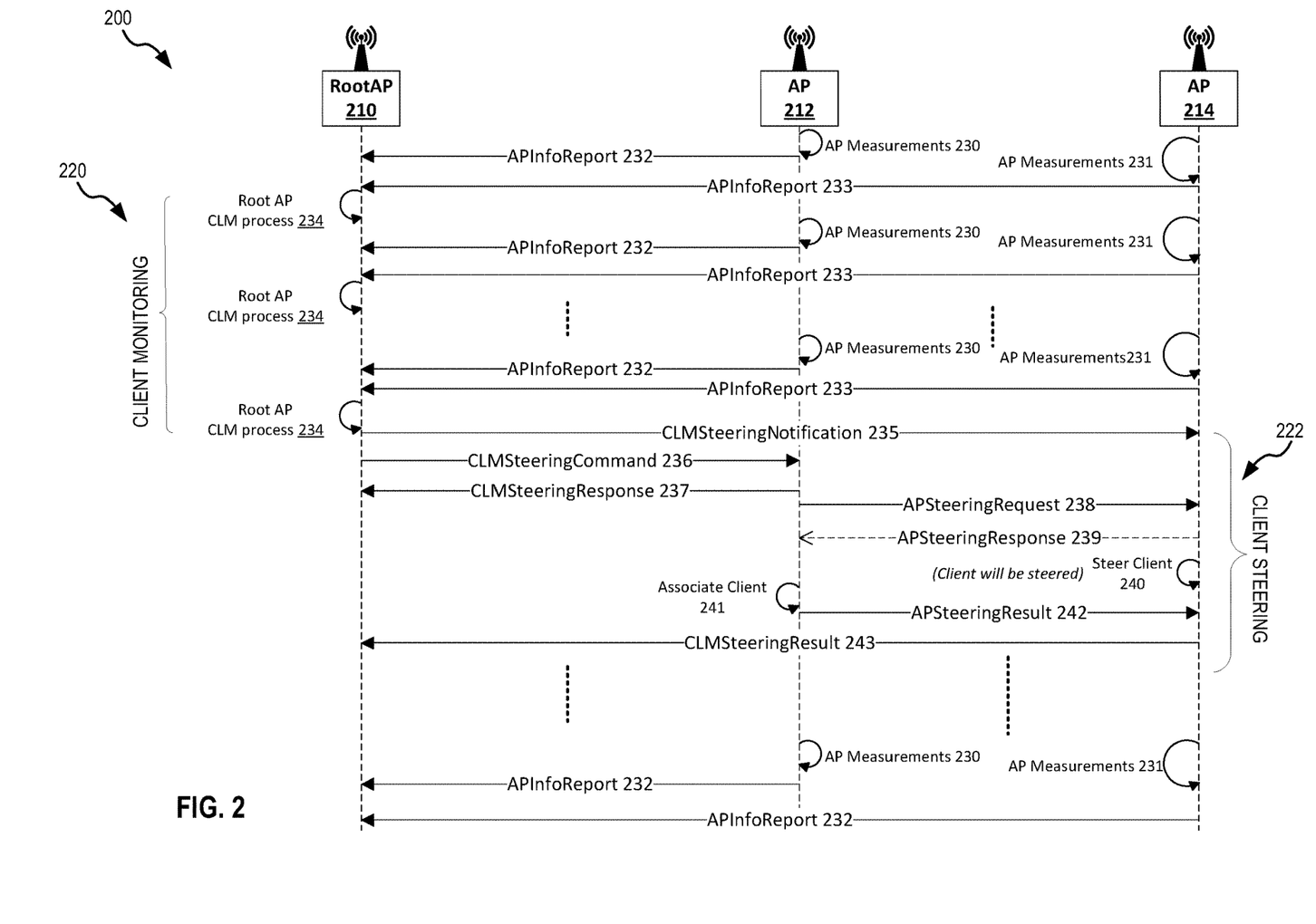
FIG. 2 is a timing diagram for a centrally controlled multi-AP system that includes a rootAP and two APs, in an embodiment.

FIG. 2 shows a timing diagram 200 for a centrally controlled multi-AP system that includes a rootAP 210 and two APs 212, 214. Timing diagram 200 includes a first client monitoring portion 220 and a second client steering portion 222.

In client monitoring portion APs 212, 214 take AP measurements 230, 231 and generate AP information reports (also called herein "APInfoReports"), similar or the same as CARs 150 of FIG. 1, described above. APInfoReports 232, 233 are then transmitted to rootAP 210 which process the APInfoReports 232, 233 via a root AP CLM process 234. These steps may occur a plurality of times until root AP 210 produces a CLMSteeringNotification 235. CLMSteeringNotification 235 informs AP 214 that root AP 210 has determined to steer an AP 214 associated client to AP 212.

RootAp 210 then transmits a CLMSteeringCommand 236 to AP 212, which directs AP 212 to initiate a steering request process which results in AP 212 transmitting a CLMSteeringResponse 237 to rootAP 210 and an APSteeringRequest 238 to AP 214. CLMSteeringResponse 237 is a response to rootAP 210's CLMSteeringCommand 236. APSteeringRequest 238 is a request made by AP 212 to AP 214 to cooperate to steer an AP 214 associated client to AP 212. AP 214 then optionally responds to the APSteeringRequest 238 by transmitting an APSteeringResponse 239 to AP 212 and steers client 240. In a separate example, AP 214 does not reach consensus with AP 212 (or rootAP 210) and rejects the steering request from AP 212. Rejecting the steering request from AP 212 may be by, for example, ignoring the request or may be by informing one or both of AP 212 and rootAP 210 that it will not disassociate the client.

Returning to the example of FIG. 2, after AP 214 steers client 240, AP 212 associates client 241. AP 212 then provides AP 214 with an APSteeringResult 242. AP 214 then transmits a CLMSteeringResult 243 to rootAP 210 to finalize the process and restart the AP measurement and APInfoReport processes 230-234, as similarly described above.

Figure 3:
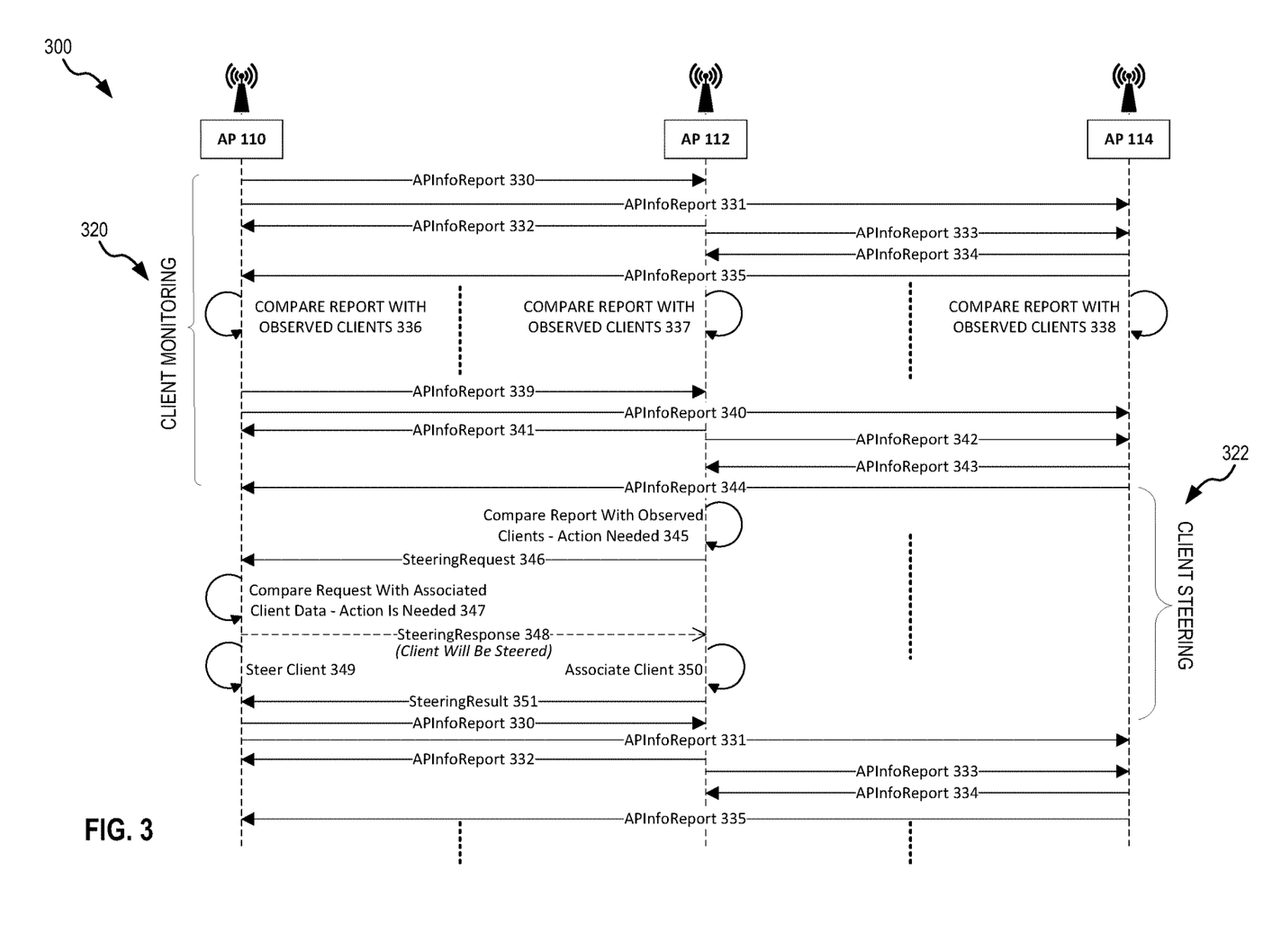
FIG. 3 is a timing diagram for a collaborative multi-AP system that includes three APs, in an embodiment.

FIG. 3 shows a timing diagram 300 for exemplary system 100 of FIG. 1, which includes APs 110-114. Timing diagram 300 includes a first client monitoring portion 320 and a second client steering portion 322.

APs 110-114 share AP Information reports APInfoReports 330-335. To simplify FIG. 3 AP measurements are not shown, but it will be understood that system 300 will periodically perform a measurement process, similar to the measurement process that generates AP measurement 230-231 of FIG. 2, of purposes of populating APInfoReport 330-335, 339-344. Each AP 110-114 the compares report with observed clients 336-338. APs 110-114 then again shares AP Information reports via APInfoReports 339-344 (also called CARs, such as CARs 150, herein).

AP 112 then compares the report with observed client-action needed 345. AP 112 the sends a steering request 346 to AP 110. AP 110 process the steering request in the compare request with associated client data—action is needed 347. In the situation where AP 110 arrives at a consensus with AP 112 (as similarly described in FIG. 1, above), the AP 110 transmits a SteeringResponse 348 to AP 112, which is processed resulting in AP 110 Steering Client 349 and AP 112 Associating Client 350. Steering Client 349 may be, for example, AP 110 disassociating the client and entering the client on a Deny MAC Access List (not shown but discussed above) such that the client will not re-associate and will be steer to AP 112, where it associates. AP 112 then optionally sends a steering result 351 to AP 110 to inform AP 110 of the successful association. APs 110-114 then again share AP information Reports via APInfoReports 330-335.

Figure 4:
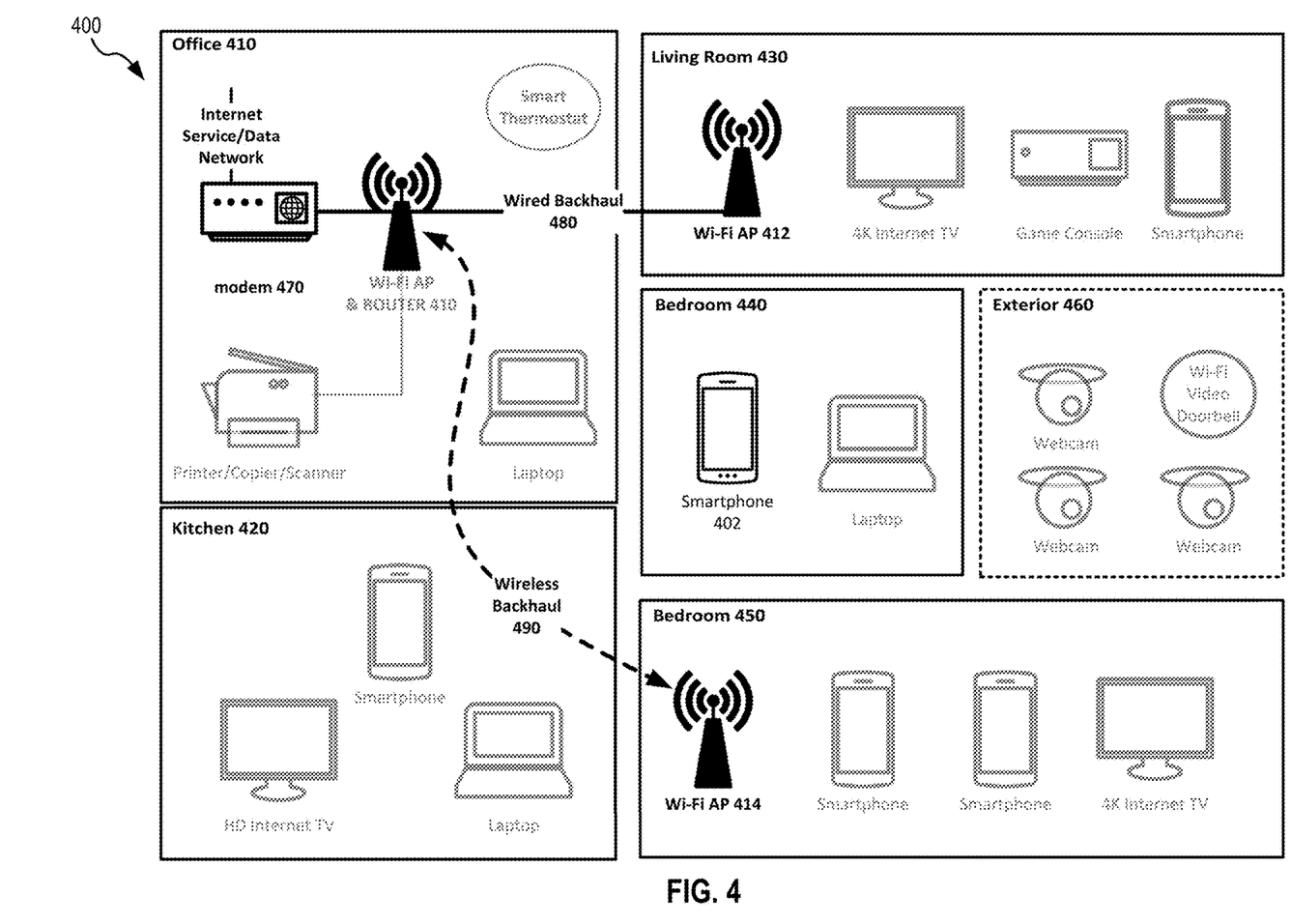
FIG. 4 shows a crowded Multi-AP environment with three APs, in an embodiment.

FIG. 4 shows a crowded Multi-AP environment 400 with three APs, APs 410, 412, and 414. Multi-AP environment 400 includes an office 410, a kitchen 420, a living room 430, two bedrooms 440, 450, and an exterior space 460. In living room 430 is Wi-Fi AP 412. In bedroom 450 is Wi-Fi AP 414.

In office 410 is a Wi-Fi AP and router 410 (also called herein gateway AP 410 or just AP 410), and a modem 470 (which may also be ONT 470 if implemented in an optical communication environment) connected to data network, such as the internet, a local area network, a DOCSIS network, an optical network, or similar.

Figure 5:
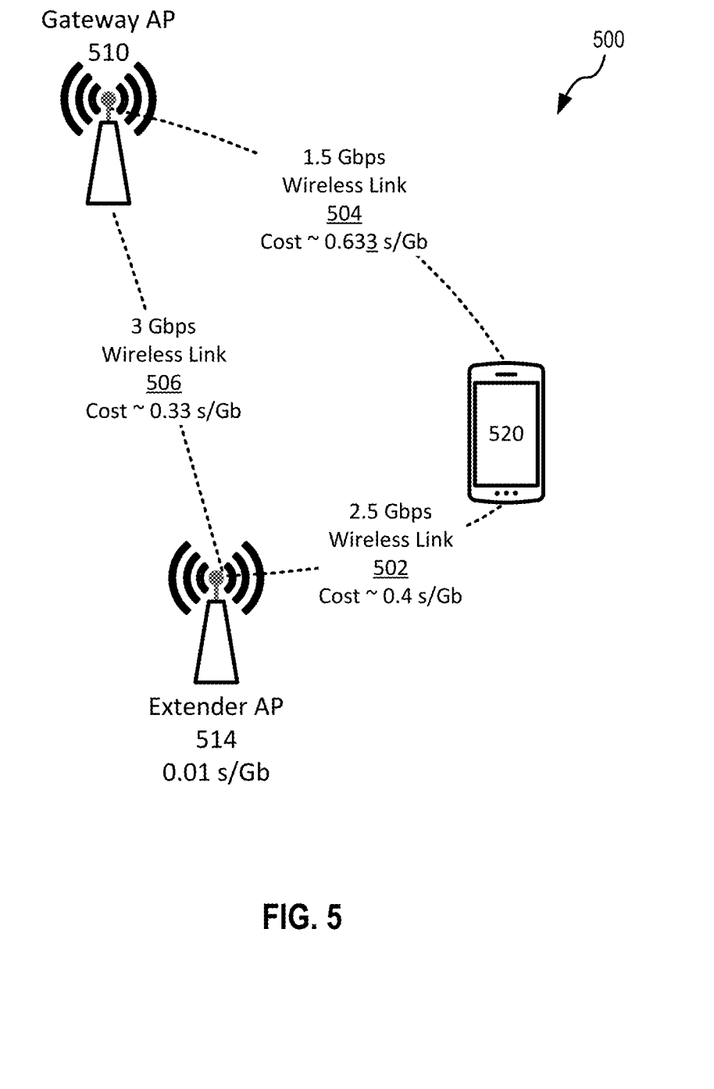
FIG. 5 shows one exemplary multi-AP system with data utilized in one least cost routing calculus, in an embodiment.

Environment 400 is shown with both a wired backhaul 480, between an AP 412 and a gateway AP 410, and a wireless backhaul 490, between an AP 414 and gateway AP 410. In such a multi-AP environment a least-cost routing calculus may be performed to determine the best path for data to travel. One exemplary least cost routing calculus is represented in FIG. 5, below.

Wireless clients within environment 400 have a plurality of connection options. As such APs may utilize a least-cost routing calculus to determine the best direct or indirect connection to gateway AP 410, and subsequently the internet. The least-cost routing calculus takes into consideration the time per gigabit (e.g., [seconds/Gb]) for wired transmission, wireless transmission, and data rate delays associated with internal processing delays. Internal processing delays may include but are not limited to time per gigabit for the transmission from a receiving side to a transmission side within an AP. Other internal delays may also exist, as will be known to one skilled in the art, but are not discussed here for sake of simplicity and brevity.

For example, smart phone 402 in bedroom 440 may connect to one of AP 410, 412, or 414. Connection to AP 414 would require a first wireless transmission from smart phone 402 to AP 414 having a first wireless date rate, and a second wireless transmission via wireless backhaul 490 from AP 414 to gateway AP 410 having a second wireless data rate. There is also an internal delay, as discussed above. Thus, the least-cost routing calculus determines a first path data rate (from smartphone 402 to AP 414 then to gateway AP 410) by summing first wireless date rate, plus the internal delay, plus the second wireless data rate. Other communication paths are also available to the smart phone. One exemplary second communication path is from smartphone 402 straight to gateway AP 410. A third communication path is from smartphone 402 to gate AP 410 via a wireless transmission from smartphone 410 to AP 412 and wired backhaul 480 from AP 412 to gateway AP 410. Through environment 400 measurements, shared CAR data (e.g., CAR 150 and APInfoReport 232-233, 330-335), AP coordination, and the least-cost routing calculus APs 410, 412, 414 may determine that the communication path with the best data through-put is, for example, the third communication path due to great through put on wired backhaul 480.

It will be understood that the above example is simplified and a plurality of variables may be utilized as inputs into the least-cost routing calculus when determining the best communication path. Some non-limiting examples of additional metrics includes inter AP compatibility, latency reduction mechanisms and protocols, technology and functionality matches and mismatches between clients and APs (including between a first AP and a second AP), etc.

FIG. 5 shows one exemplary system 500 with data utilized in one least cost routing calculus. Other data that may be utilized in other least cost routing calculus include but are not limited to maximized throughput, maximized goodput (i.e., application-level throughput), and a guaranteed QoS (e.g, based on at least one or more of a minimum throughput, maximum latency, maximum jitter, etc.).

System 500 includes a client 520, a gateway AP 510, and an extender AP 514. Client 520 is in two-way wireless communication with extender AP 514 via 1.5 Gbps wireless link 504 and gateway AP 510 via 2.5 Gbps wireless link 502. Extender AP 514 is in two-way wireless communication with Gateway AP 510 via 3 Gbps wireless link 506. The time per Gbit cost (hereinafter the "cost") for 1.5 Gbps wireless link 504 is 0.633 s/Gbit. The cost for 2.5 Gbps wireless link 502 is ~0.4 s/Gbit. The cost for 3 Gbps wireless link 506 is ~0.33 s/Gbit. In addition the delay within extender AP 514 is ~0.001 s/Gbit.

A least cost routing calculus for association by client 520 with gateway AP 510 is therefore ~0.633 s/Gbit. The least cost routing calculus for association with extender AP 514 is the sum of the costs of 2.5 Gbps wireless link 502, internal delay of extender AP 514, and 3 Gbps wireless link 506, which is 0.4 s/Gbit+0.01 s/Gbit+0.33 s/Gbit=0.74 s/Gbit. Thus, direct association by client 520 with gateway AP 510 results in the best performance for client 520.

Other factors may contribute to the least cost routing calculus, including but not limited to available AP resources, throughput on the links (e.g., number of retries on the link, BER, etc.). The least cost routing calculus may advantageously rely on AP measured and shared data (e.g., CAR 150, APInfoReport 232-233, AP Measurements 230-231, APInfoReport 330-335, 339-344, etc.) and distributed through the system, e.g., system 100, 200 300, 400, and 500.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A first access point (AP) operating on a first channel of a wireless environment, comprising:
   a receiving portion configured to measure the wireless environment at the first AP;
   a processing portion configured to generate a first client association report (CAR) based on the measured wireless environment at the first AP;
   a transmitting portion configured to transmit the first CAR to a second AP in communication with the first AP and the wireless environment, wherein the second AP is different from the first AP, and the second AP operating on a second channel of the wireless network environment different from the first channel;
   wherein the receiving portion is further configured to receive a second CAR from the second AP, wherein the second CAR is based on a measurement of the wireless environment at the second AP;
   wherein the processing portion is further configured to (i) jointly process the first and second CARs, (ii) reach a consensus decision for a cooperative action with the second AP, (iii) determine, based on the consensus decision, that the first AP is to change its operation from the first operating channel to the second operating channel, and (iv) cause the first AP to operate on the second operating channel.

2. The first AP of claim 1, wherein the processing portion is further configured to execute an algorithm shared with the second AP.

3. The first AP of claim 2, wherein the processing portion is further configured to execute the shared algorithm according to a predetermined schedule.

4. The first AP of claim 3, wherein the processing portion is further configured to execute the shared algorithm periodically.

5. The first AP of claim 1, further comprising a direct communication link with the second AP.

6. The first AP of claim 1, wherein the receiving portion is further configured to obtain a holistic view of a network within the wireless environment that includes the first and second APs.

7. The first AP of claim 6, wherein the processing portion is further configured to coordinate with the second AP to enable at least one of client link management and radio resource management of the network.

8. The first AP of claim 7, wherein the processing portion is further configured to avoid radio frequency interference while maintaining a high throughput of a fronthaul and a backhaul of the network.

9. The first AP of claim 7, wherein the processing portion is further configured to maintain the high throughput based on a change to one or more of (i) the first channel to the second channel, (ii) a network band, (iii) a channel width, and (iv) a transmit power.

10. The AP of claim 1, wherein the processing portion is further configured to distribute a client handover from the first AP to the second AP according to the cooperative action and the consensus decision reached through communication between the first AP and the second AP.

11. The first AP of claim 1, wherein the processing portion is further configured to utilize a predictive algorithm to generate predictive data based on the first and second CARs shared between the first and second APs.

12. The first AP of claim 1, wherein the processing portion is further configured to coordinate AP discovery between the first and second APs.

13. An upstream monitoring and management interface for a wireless environment of a plurality of access points (APs), the interface in operable communication with a first AP of the plurality of APs, the interface comprising:
    an upstream receiving portion configured to obtain (i) a first client association report (CAR) generated by the first AP based on a measurement of the wireless environment at the first AP, and (ii) a second CAR from a second AP of the plurality of APs;
    a processing portion to jointly process the first and second CARs and calculate a cooperative action between the first AP and the second AP based on the jointly processed first and second CARs, the calculated cooperative action including at least one of (i) that a first client in communication with the first and second APs is to be steered to the first AP from the second AP or to the second AP from the first AP, and (ii) the first AP is to change its operation from a first operating channel of the wireless environment to a second operating channel of the wireless environment different from the first operating channel,
    a downstream transmitting portion configured to direct the first AP to execute the calculated cooperative action,
    wherein the second CAR is based on a measurement of the wireless environment at the second AP, and
    wherein the second AP is in operable communication with at least one of the interface and the first AP.

14. The interface of claim 13, wherein the upstream receiving portion is further configured to obtain the second CAR directly from the second AP.

15. The interface of claim 13, wherein the upstream receiving portion is further configured to obtain the second CAR from the first AP in operable communication with the second AP.

16. The interface of claim 15, wherein the processing portion is further configured to utilize a predictive algorithm to generate predictive data based on a sharing of the first and second CARs between the first and second APs.

17. The interface of claim 13, wherein the processing portion is further configured to execute an algorithm shared with at least one of the first AP and the second AP.

18. The interface of claim 17, wherein the processing portion is further configured to execute the shared algorithm according to at least one of (i) a predetermined schedule, and (ii) a periodic timing scheme.

19. The interface of claim 13, wherein the upstream receiving portion is further configured to obtain a holistic view of a network within the wireless environment that includes the first and second APs.

20. The interface of claim 19, wherein the processing portion is further configured to coordinate with the second AP to enable at least one of client link management and radio resource management of the network.

* * * * *